UNITED STATES PATENT OFFICE.

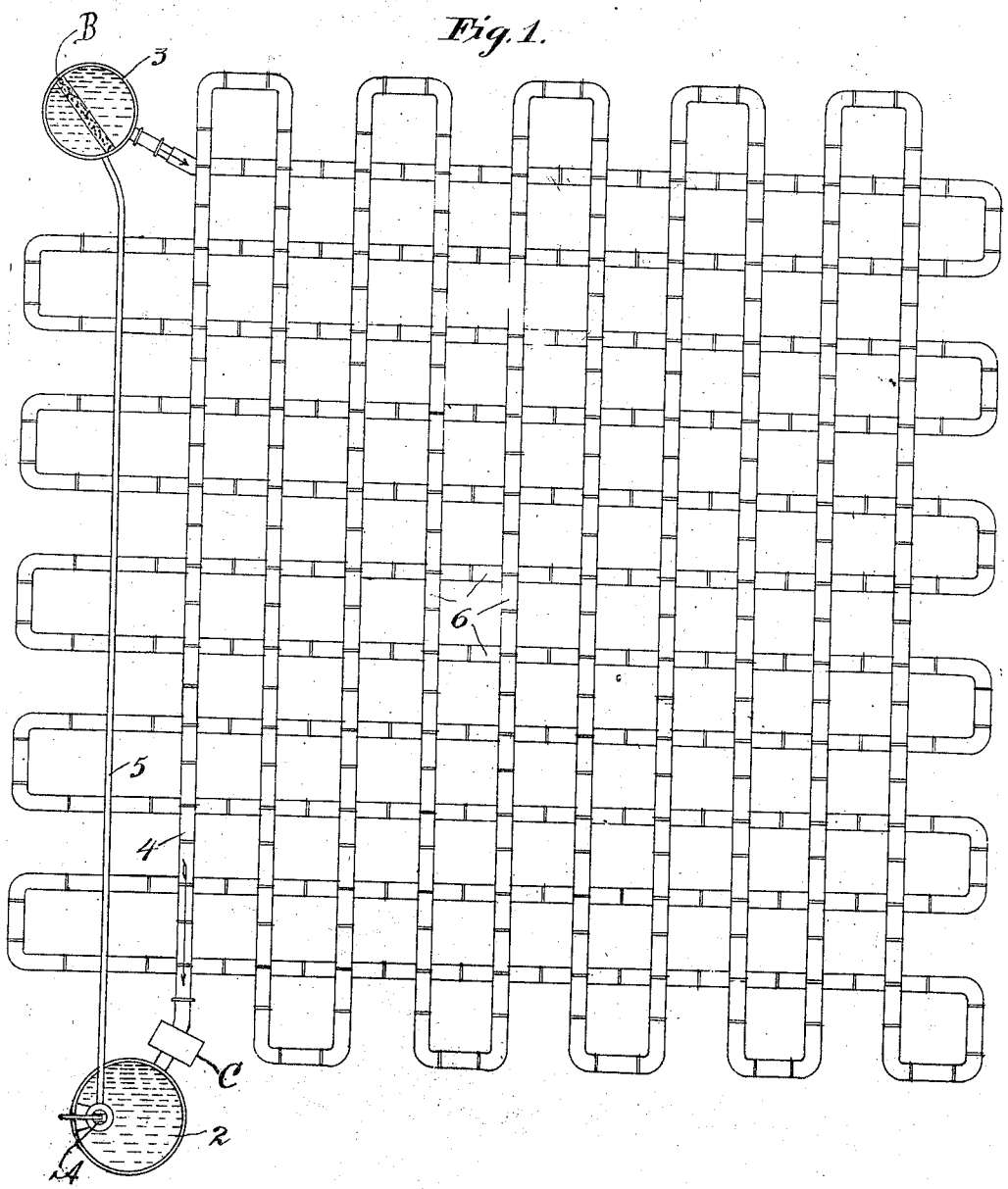

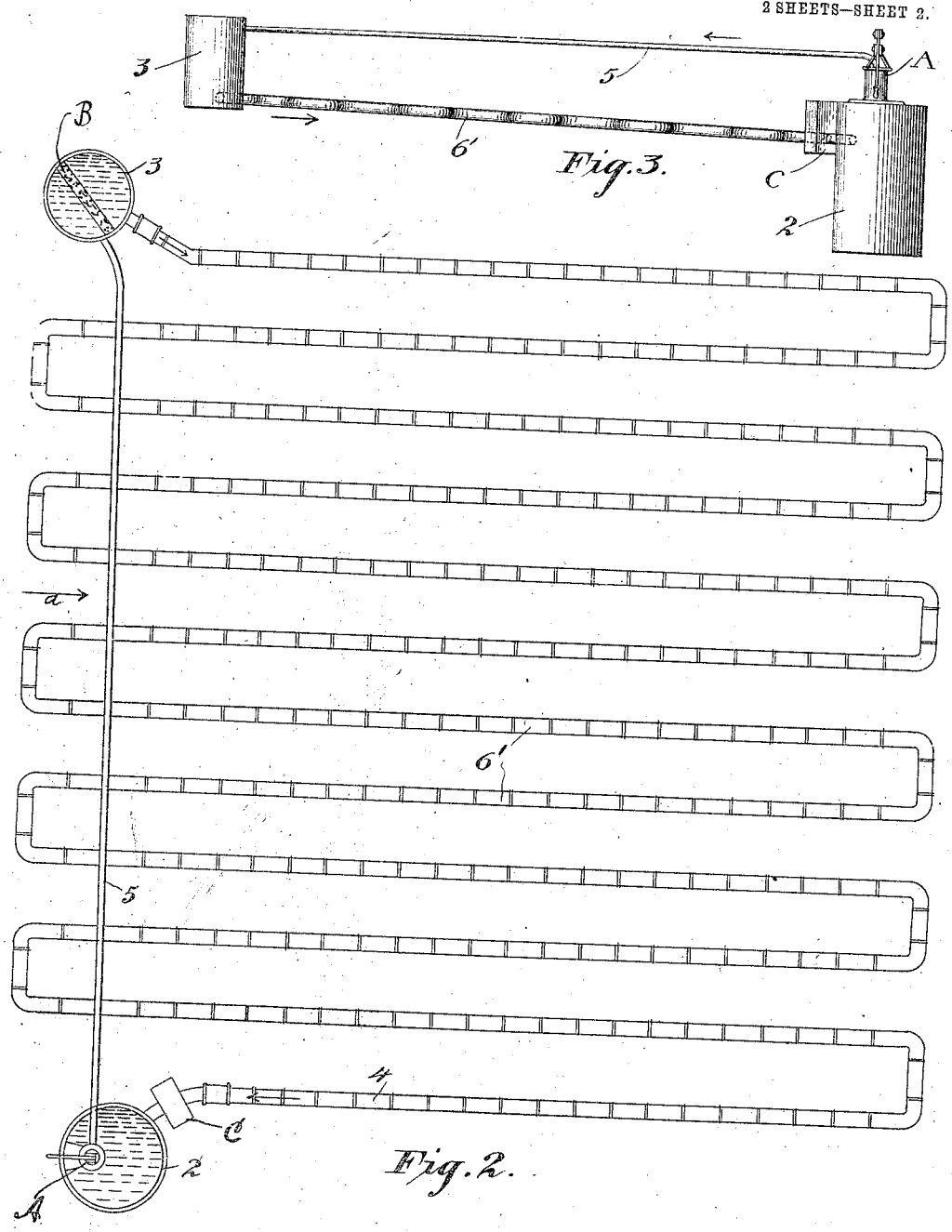

JOSEPH P. HARDIN, OF PAWNEE CITY, NEBRASKA.

SYSTEM OF SUBIRRIGATION.

965,895.  Specification of Letters Patent.  Patented Aug. 2, 1910.

Application filed October 11, 1909. Serial No. 522,153.

*To all whom it may concern:*

Be it known that I, JOSEPH P. HARDIN, a citizen of the United States, residing at Pawnee City, in the county of Pawnee and State of Nebraska, have invented a new, original, and Improved System of Subirrigation, of which the following is a specification.

My invention relates to a new and useful system of underground irrigation, by means of which, a very economical and simple plan is provided; more particularly, my invention has reference to a system by means of which an uninterrupted flow of water through a continuous line of tiling is carried to the soil beneath the surface, the water being supplied from an elevated tank from which the water flows, by gravity, into the tiling placed in the ground at such depth and distance apart as experience and the character of the soil demand.

My system contemplates the use of a tiling sufficiently porous to permit the water to escape into the soil as it flows through in its course, the tiling being so constructed as to permit of its being joined closely and snugly together at the ends, so as to make a solid and continuous line of pipe. By the use of my system, the surface of the soil remains intact and there is no waste of land.

By my system, a continuous line of tiling is placed in the ground, beginning at an elevated tank and ending at a well, or other natural source from whence the water is had primarily. The water is to be pumped from the well, or other natural source, into a receiving tank, and from thence it flows, by gravity, into the tiling, attached near the bottom of the tank.

My system further contemplates, and has reference to, the filtering of the water, both before it enters the tiling from the tank and before that which does not percolate through the tiling as it flows therein, returns to the well, its original source, thus removing all sediment, and preventing the clogging of the tiling.

By my system, there can be no loss of water, for it is confined in the tiling from the time it leaves the tank until it reaches the primary source, and all that which does not soak out or percolate through the tiling eventually returns to the source of supply and is again used. This feature results in saving all the water for the purpose intended—the irrigation of the soil.

To sum up the entire matter, the objects of my invention are, to furnish a cheap, simple, effective, and economical method of sub-irrigation, one easily operated, and by the use of which there is great saving of water and labor, and one which will enable the farmer to irrigate his crops at any time, and at will. I attain these objects in the manner illustrated in the accompanying drawings.

Figure 1—is a plan view of my invention, showing this entire system. Fig. 2—is a similar view of my system, in a modified form. Fig. 3 is a view in elevation of the system shown in Fig. 2, looking in the direction of the arrow $a$.

In both of these Figs., 1 and 2, the tiling 6 and 6' respectively is placed beneath the surface of the ground, at whatever depth and distance apart may be desired, and laid in one continuous line, back and forth across the land from the receiving tank to the well, the original source of the water.

2 represents the well from which the water is forced into a reservoir or tank.

3 represents the tank.

4 represents the return end of the tile through which the surplus water returns to its source.

5 represents the pipe through which the water is forced from the well by some mechanical power, into the receiving tank.

6 represents the line of tiling in Fig. 1.

6' represents the line of tiling in Fig. 2.

A—represents a force pump placed in the well 2 by means of which, the water is pumped through the pipe 5, by some mechanical power, into the reservoir or receiving tank on the opposite side of the filter from which it enters the tiling.

B—represents a filter constructed in the center of the tank 3.

C—represents a filter into which the surplus water from the return tile 4 flows. By means of this filter any sediment gathered by the water in its course through the tiling, will be removed, and the water rendered ready for use again in the original manner.

In the operation of my system, water is drawn by the pump A from the well 2 and forced through the pipe 5 into the elevated reservoir 3, containing the filter B. From this tank 3 the water, cleansed of sediment by its passage through the filter B, flows by gravity through the tiling 6 (Fig. 1) or 6' (Fig. 2), irrigating the soil as it slowly flows along. That portion of the water which does not percolate through the tiling is delivered by the terminal pipe 4 to the filter C, whence it passes into the well 2, from which it was originally pumped.

After the system is installed as herein outlined, the simple process of starting the force pump to work puts the entire plant into operation. The water is forced into the tank, then passes through the filter and out into the tile; thence it flows through the tiling, and reaches the crops, by percolation through the tiling, all surplus water returning to the primary source.

I am aware that other systems of underground irrigation have been provided; but I am not aware of any system being used, in connection with which a continuous line of tiling is provided, through which the water flows and reaches the crops, having a return end at the well, or primary source; nor of any system that provides for the double filtering of the water, as herein outlined.

Having fully described my invention, its construction, and method of operation,— what I claim as new and original, and desire to secure by Letters Patent, is:

In an irrigation system, a source of water supply, a reservoir located at a higher level than said source of supply, means for forcing water from said source of supply to said reservoir, a filter in said reservoir, a subterranean line of tiling leading from said reservoir and adapted to convey water by gravity for irrigation purposes, and a second filter forming a connection between the lower terminal of the tiling and the source of supply.

JOSEPH P. HARDIN.

Witnesses:
WILLIAM G. TOMPSON,
WARREN V. TOMPSON.